United States Patent [19]
Davis

[11] 3,786,981
[45] Jan. 22, 1974

[54] CONTINUOUS SOLDERING APPARATUS

[75] Inventor: Dan Bryan Davis, Ile Perrot, Quebec, Canada

[73] Assignee: Northern Electric Company Limited, Montreal, Quebec, Canada

[22] Filed: Feb. 25, 1972

[21] Appl. No.: 229,321

[52] U.S. Cl............ 228/4, 29/33 D, 29/500, 219/6.5, 228/33, 228/41, 228/46
[51] Int. Cl.............................................. B23k 1/00
[58] Field of Search......... 228/5, 15, 17, 33, 41, 56, 228/4, 46; 219/6.5, 62; 29/33 D, 202.5, 500

[56] References Cited
UNITED STATES PATENTS

| | | | |
|---|---|---|---|
| 1,685,269 | 9/1928 | Bundy | 29/202.5 X |
| 2,730,135 | 1/1956 | Wallace | 228/56 X |
| 3,026,924 | 3/1962 | Lunt et al. | 29/202.5 |
| 3,052,199 | 9/1962 | Wiley | 29/477.7 |
| 3,203,085 | 8/1965 | Turner | 29/498 |
| 3,397,442 | 8/1968 | McJean | 29/202.5 |
| 3,634,606 | 1/1972 | Jyengar | 174/28 X |

Primary Examiner—J. Spencer Overholser
Assistant Examiner—Robert J. Craig
Attorney, Agent, or Firm—Sidney T. Jelly

[57] ABSTRACT

Soldering apparatus, and method, for soldering a butt strap over a butt joint of a tube, particularly a corrugated tube, as used for the outer conductor of a coaxial cable. The soldering member is in two opposed parts acting on the strap and tube to maintain the strap in correct alignment and in intimate contact while soldering, the soldering member floating and sliding on the tube.

1 Claim, 3 Drawing Figures

3,786,981

CONTINUOUS SOLDERING APPARATUS

This invention relates to continuous soldering, and is particularly but not exclusively to the soldering of corrugated butt straps over the butt joints of corrugated tubes. A typical example of such a tube is one as disclosed in U.S. Pat. No. 3,634,606 issued Jan. 11, 1972.

In continuous soldering, the parts to be soldered require to be positioned in a correct relationship and then held in that relationship while the solder is molten and while the solder freezes.

The correct positioned relationship must be maintained regardless of any variation in size, shape or other configuration of the parts. At the same time it is desirable to avoid applying any heavy stresses to the parts being soldered.

The present invention provides an apparatus for soldering two elements comprising a member having two parts which act on the elements to be soldered, the parts being loaded toward each other but mounted to float freely on the elements. Thus in soldering butt straps on tubes, the soldering member parts are grooved and grip the tube and covering butt strap between them, maintaining them in correct relationship, with the member floating freely on the tube, the heating of tube and solder, flowing of the solder and freezing of the solder occurring while the tube is passing through the member.

The invention will be understood by the following description of one embodiment, by way of example, in conjunction with the accompanying drawings, in which.

Figure 1:
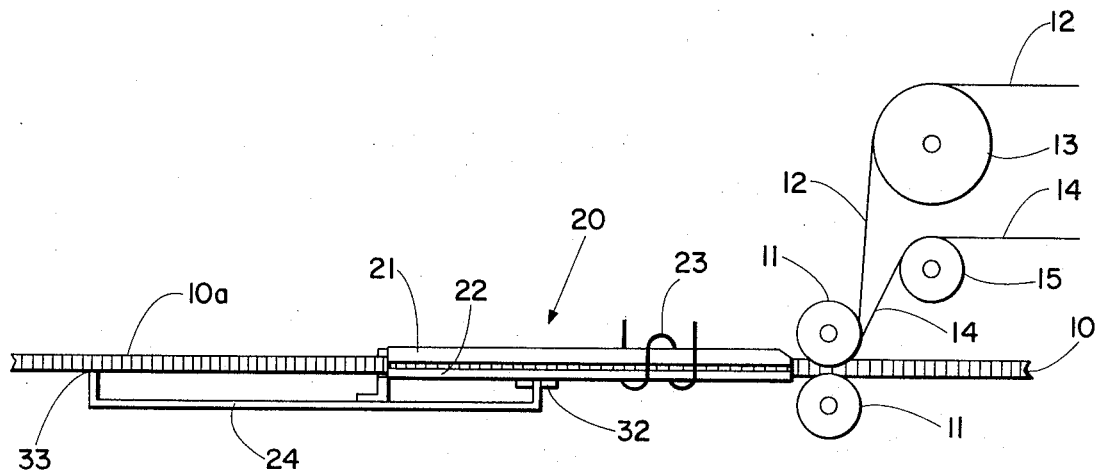
FIG. 1 is a diagrammatic side view of a continuous soldering apparatus partly in section, embodying the present invention.
Figure 2:
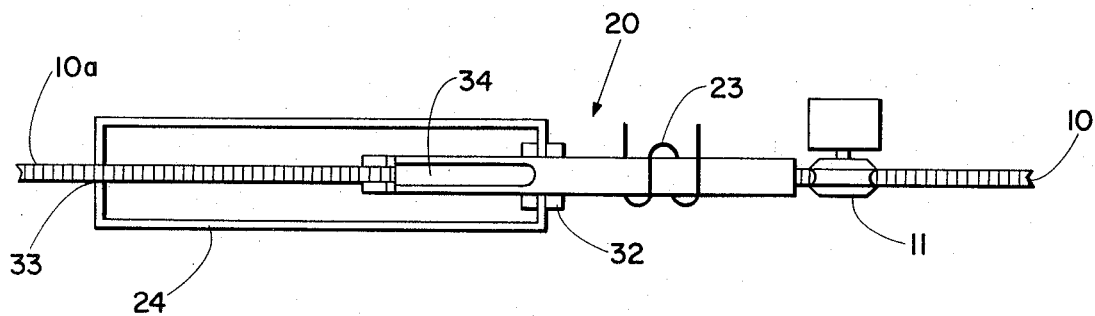
FIG. 2 is a plan view of the apparatus of FIG. 1.

FIGS. 1 and 2 illustrate diagrammatically an arrangement for soldering corrugated butt straps onto a butt joint corrugated tube. The corrugated tube 10 is fed between pressure rollers 11. A corrugated butt strap 12 is fed over a roller 13 and down into the nip between the rollers 11 and a strip of solder 14 is fed over a roller 15 and also down into the nip of the rollers 11. The solder strip 14 is positioned between the butt strap 12 and the corrugated tube 10. For clarity, rollers 13 and 15, and the butt strap 12 and solder 14 are not shown in FIG. 2. The pressure rollers 11 and the supply of butt strap and solder do not form part of the present invention and will not be further described, a more detailed description occurring in the copending application Ser. No. 229,320 filed Feb. 25, 1972 in the name of the present applicant and Bret Paul Zuber entitled REGISTERING OF TRANSVERSELY CORRUGATED ELEMENTS, and assigned to the present assignees.

Rollers 11 position the butt or cover strap 12 and tube 10 in correct relationship for feeding to the soldering member, or shoe 20. Solder member or shoe 20 will be described in more detail with reference to FIG. 3, but the general arrangement of the soldering member 20 is seen in FIGS. 1 and 2.

Member 20 comprises two parts 21 and 22 which are positioned on the tube 10 and holds the tube, butt strap and solder in correct positional relationship. A coil 23 is positioned around the member 20 and heats the tube, strap and solder as they are fed through the member 20. After the coil 23 the member 20 extends into a trough 24 filled with water. After the solder is melted at the position of the coil 23 it has time to flow before being frozen in the water cooling section. The completed tube 10 exits from the member 20 being further cooled in the trough 24.

Figure 3:
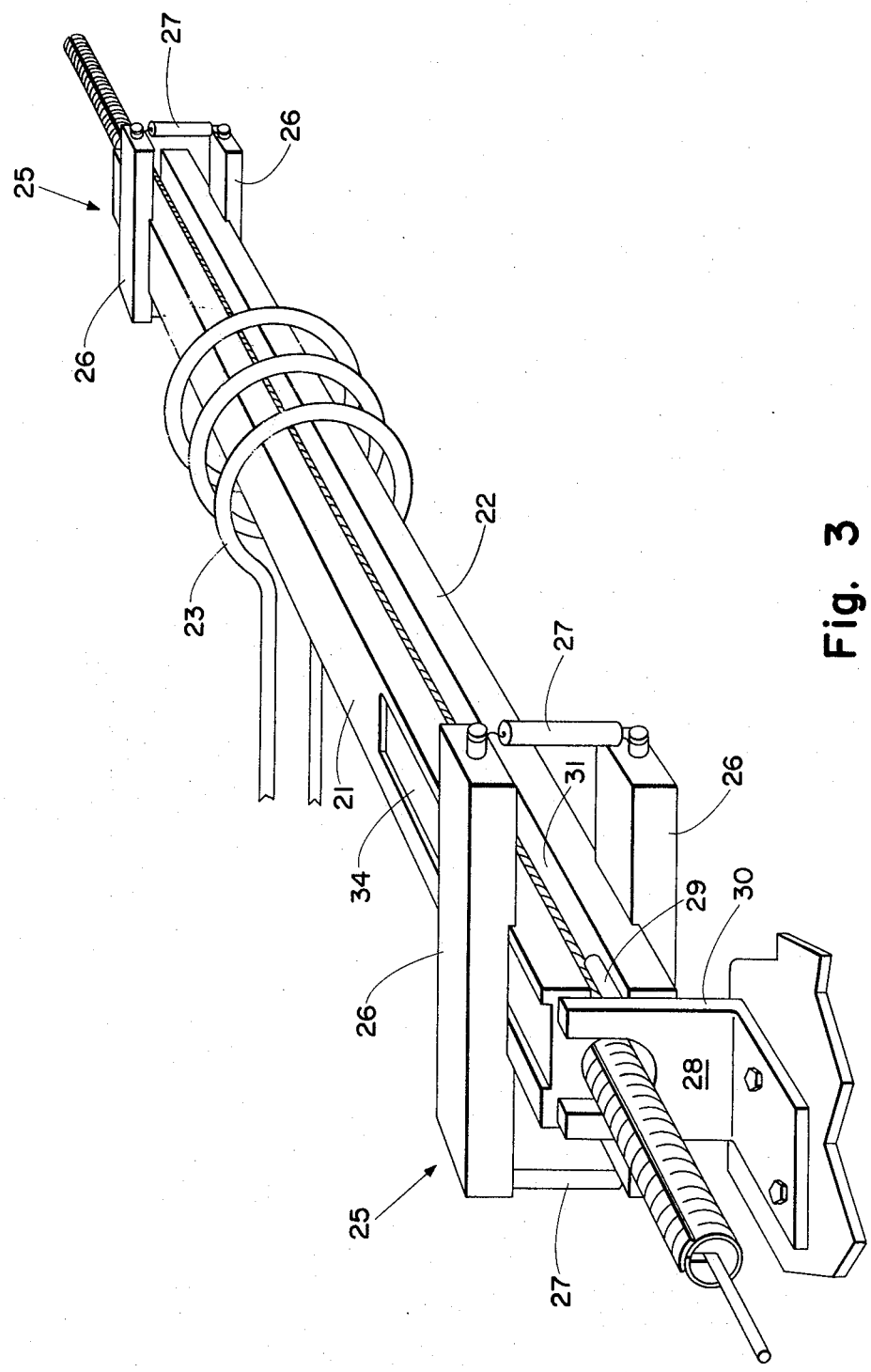
FIG. 3 is a perspective view of the device of the present invention.

Considering now FIG. 3, the soldering member 20, comprising the two parts 21 and 22, is positioned over the tube 10. The parts are held in position on the tube by clamps 25, each clamp comprising two bars 26 resiliently held together by tension springs 27. Thus the soldering member 20 is supported on the tube and is free to move sideways, and up and down, if necessary. The springs 27 exert sufficient loading on the bars 26 to maintin the butt strap 12 in close contact with the tube 60 while the soldering operation takes place, but at the same time will alow some relative movement between the two parts 21 and 22 if, for any reason, there is some slight variation in the dimensions of the tube. Also, as the solder melts, the clamps will move the butt strap into closer contact with the tube as the solder flows.

The coil 23 is a radio frequency heating coil, the heating effect being concentrated in the tube and butt strap.

As stated above, the soldering member is carried by, and floats on, the tube 10. To retain the soldering member in its correct position and prevent movement of the member longitudinally a bracket 28 is fastened to the bottom of the trough 24 in the example illustrated. Two pins 29 extend from the face 30 of the bracket 28, face 30 being that which bears against the end of the soldering member 20. The pins 29 enter the gaps 31 between the two parts 21 and 22 thus locating the end of the soldering member relative to the bracket, but allowing some freedom of movement.

The cooling section of the soldering member 20 extends into the trough 24. The water level is approximately at or slightly above the bottom surface of the top part 21 of the soldering member 20. A simple seal is provided at the forward end 32 of the trough to restrict escape of water and the completed tube 10A exits from the trough through a groove in the rearward end 33, (FIGS. 1 and 2).

The water flows up and over the tube 10, between the tube and the top part 21, by capillary action. A shallow trough 34, may also be formed in the top part 21 in the cooling section, and water supplied to this trough through a small tube (not shown).

The present invention provides a soldering system which is effective and avoids or overcomes problems inherent in previous arrangements. The floating feature of the soldering member, or shoe, ensures that the tube is not deflected from its straight path through the soldering operation. This path is determined by the tension in the tube. The closing forces exerted by the member, or shoe, are confined to the tube. Thus the member causes no misalignment and wear of the contact surfaces does not change the alignment.

The continuous confinement by the soldering member ensures that the joint elements —the tube and butt strap—experience a continuous and steady pressure urging them together during the entire cycle of melting, flowing and freezing of the solder. There is no opportunity for premature separation of the elements. The floating arrangement permits the extended length of continuous contact without misalignment and high friction and high pulling forces.

The soldering member, being of two parts with openings between, permits a rapid and easy cooling of the tube once it has left the heating zone, the tube parts being still confined. The soldering element is compact and permits an extremely efficient heating coil arrangement. The heating can be concentrated at the joint —an advantage which does not always occur with other system.

The use of a spring loaded soldering member is particularly advantageous in the soldering of corrugated tubes. It is essential that the butt strap and the tube be kept in complete and accurate register during the soldering process. The strap and tube are brought into correct positional relationship at the rollers 11 but the effect of these rollers is maintained over only a short length. The spring-loaded soldering member is positioned close to the rollers 11 and maintains the correct positional relationship with each corrugation of the butt strap correctly engaged with a corrugation on the tube.

The two parts 21 and 22 of the soldering member 20 are grooved with a cross-section to match the cross-section of the tube. The top part 21 has a recess along the groove to accommodate the butt strap. This groove assists in maintaining the butt strap in the correct position.

One particular form of continuous soldering is that in which a corrugated tube is formed by soldering overlapping edges of a strip bent to form the tube. In this operation the joint is acted upon by a plurality of separate shoes. This results in intermittent and unsteady contact between the joint elements during melting and freezing of the solder. This results in poor joint quality.

While a lower quality of joint can be accepted for tubes which act mainly as a protective sheath, for corrugated tubes used as the outer conductor of coaxial cables it is essential that a close, completely soldered joint is made. The cover or butt strap is very flimsy and the soldering member of the present invention with the continuous action handles the flimsy material quite easily. The butting together of the edges of the joint in the tube gives a rigid structure which acts as its own mandrel as the butt strap is pushed down and formed to an arcuate cross-section. In cables in which the corrugated tube is used mainly as a protection sheath, the cable itself acts as a mandrel. Further the joint is often slightly flattened. With coaxial cables, there is no support inside the tube. Although spacer discs are provided to locate the centre conductor, these spacer discs usually have a slight peripheral clearance, and are not strong enough or positioned close enough to provide any support to the tube as it is soldered.

The soldering member parts 21 and 22 can be of varying materials. As far as possible the material should have little or no response to r.f. heating. A typical material is a hard asbestos-cement material. This has negligible response to r.f. heating, is fairly long wearing, has sufficient strength and is not unduly brittle. It is possible to make different sections of differing materials. Thus the section in the r.f. heating zone could be asbestos cement material, while the section in the cooling zone could be metallic, for example stainless steel or bronze. Metal sections in the cooling zone give good conduction of heat to the water in the trough, long wearing contact surfaces and long term economy. The sections would abut one another, and a clamp could be positioned at the joint. Porous metal plates could be used in the cooling zone.

The number of clamps 25 (FIG. 3) can be varied as desired. Only two such clamps are shon in FIG. 3, but usually additional clamps would be positioned either side of the heating coil 23. Bars 26 of the clamps would usually be made of stainless steel in the cooling zone and of aluminum in the r.f. zone because of the low response of aluminum to r.f. heating.

Although described in relation to the soldering of a currugated butt strap to a corrugated butt joint tube, the invention is applicable to other continuous soldering techniques. Thus lapp joints can be soldered, non-corrugated members can be soldered, and also joint between members other than a tube and a butt or cover strap.

I claim:

1. Apparatus for continuously soldering a corrugated butt strap on a butt joint of a corrugated tube for a coaxial cable, comprising:
   a pair of opposed rollers, adapted to feed said corrugated tube;
   means for feeding a corrugated butt strap between one of said rollers and said tube, aligned over said butt joint of said tube;
   means for feeding a strip of solder between said butt strap and said butt joint;
   a soldering member supported on said tube and in sliding relationship therewith; said soldering member including two opposed elongated parts substantially enclosing said tube, one of said parts grooved to receive said tube, the other of said parts grooved to receive said tube and butt strap;
   means resiliently urging said parts of said soldering member together and into sliding engagement with said tube and said butt strap;
   endwise locating means retaining said soldering member in relative longitudinal position;
   a radio frequency heating coil extending around said soldering member, at a position intermediate the ends of said soldering member; and
   cooling means for cooling the soldered tube on issue from said soldering member.

* * * * *